United States Patent [19]

Hosoya

[11] 4,164,750
[45] Aug. 14, 1979

[54] VIR KILLER SIGNAL GENERATOR FOR COLOR TELEVISION RECEIVER

[75] Inventor: Nobukazu Hosoya, Ikoma, Japan

[73] Assignee: Sanyo Electric Co., Ltd., Osaka, Japan

[21] Appl. No.: 904,449

[22] Filed: May 9, 1978

[30] Foreign Application Priority Data

May 9, 1977 [JP] Japan ............................ 52/54520
May 9, 1977 [JP] Japan ............................ 52/54521
May 9, 1977 [JP] Japan ............................ 52/54522
Nov. 18, 1977 [JP] Japan ............................ 52/139594

[51] Int. Cl.$^2$ ........................ H04N/9/49; H04N 9/535
[52] U.S. Cl. ................................. 358/26; 358/21 V;
[58] Field of Search ................... 358/10, 26, 28, 34, 358/21 V

[56] References Cited

U.S. PATENT DOCUMENTS 3,673,320  6/1972  Carnt et al. .................... 358/10 X
3,755,617  8/1973  Ichida ................................ 358/28

*Primary Examiner*—Richard Murray
*Assistant Examiner*—Aristotelis M. Psitos
*Attorney, Agent, or Firm*—Armstrong, Nikaido, Marmelstein & Kubovcik

[57] ABSTRACT

A killer signal generator for use in a color television receiver having an information processing circuit for processing specific information such as VIR information contained in a line during the vertical blanking interval. The killer signal generator comprises a line pulse sampling circuit for generating pulses synchronized with the line in which the specific information is contained, a D.C. restorer for restoring D.C. component of a series of video information, which includes a differential pair composed of first and second transistors, the first transistor having a base receiving the video information including the specific information while the second transistor has a base connected to a constant reference potential and an input end adapted to receive the video information through a capacitor, and for generating D.C. restored output corresponding to the specific information, and a killer signal generator for generating an operation signal for enabling the information processing circuit when the color television receiver receives video information with the specific information and also a killer signal for bringing the information processing circuit into an inoperative condition when it is not.

6 Claims, 11 Drawing Figures

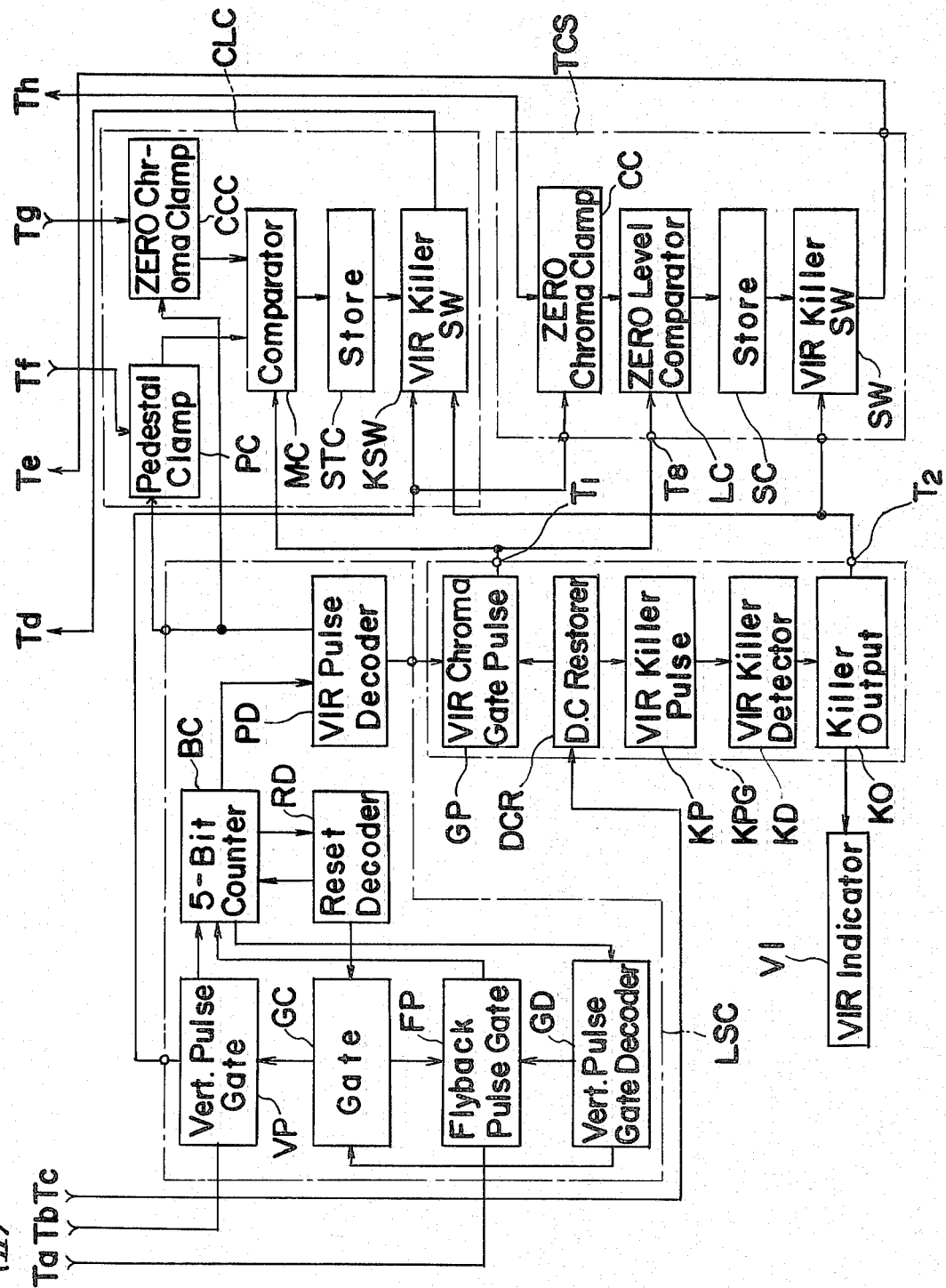
Fig. 3 (II)

VIR KILLER SIGNAL GENERATOR FOR COLOR TELEVISION RECEIVER

The present invention relates to a killer signal generating circuit for use in a color television receiver having an information processing circuit for processing specific information such as VIR (vertical interval reference) information, still picture information or multiplexed voice information contained in composite sync signals, said killer signal being used for bringing the processing circuit into inoperative state when said color television receiver receives an ordinary video information.

It is to be noted that the term "ordinary video information" hereinbefore and hereinafter employed is defined as meaning the one which does not contain any specific signal such as VIR information, in contrast to a VIR signal containing video information.

Generally, while a telvised signal is transmitted from a broadcasting station to a receiver, hue, saturation and brightness information contained therein tend to be distorted. In order to compensate for such distortion in hue, saturation and brightness in a receiver, a VIR system has been proposed.

In the VIR system currently used, the VIR information is carried on the 19th line in vertical blanking interval which covers 21 lines of each field as shown in FIG. 1. The VIR information includes chroma reference, luminance reference and black level reference as shown in FIG. 2.

In order to use VIR information, a VIR information processing circuit is provided in a television receiver and hue, tint or saturation informations are controlled therein with reference to the chroma reference, luminance reference and black level reference contained in the VIR information.

However, when a color television receiver having the VIR information processing circuit receives the ordinary video information, the processing circuit must be rendered inoperative.

As understood from the foregoing, it is required that, in a color television receiver capable of receiving anyone of the VIR signal containing video information, that is, the VIR signal containing video information, and the ordinary video information, a signal generator, which produces both VIR operation signal used to operate the VIR processing circuit and VIR killer signal used to render the VIR processing circuit inoperative in accordance with the received video information, has to be provided.

Accordingly, an essential object of the present invention is to provide a VIR killer signal generating circuit for generating not only the VIR killer signal, but also the VIR operation signal depending on the absence and presence of the VIR signal in the video information being intercepted.

Another object of the present invention is to provide a VIR killer signal generating circuit for producing the VIR killer signal and VIR operation signal, which is suited for the manufacture in the form of an integrated circuit.

A further object of the present invention is to provide a VIR killer signal generating circuit which generates a pulse representing chroma reference period in each field with VIR operation signal.

According to the present invention, the VIR pulse interval are detected by a counter for measuring the length of time starting from vertical sync pulses contained in a composite sync signal. However, in a color television receiver, a noise pulse, similar in pulse width and amplitude to a vertical synchronizing pulse, tends to occur by a shock caused, for example, during a channel selection which is generally effected by turning a channel selector to change one channel over to another channel of the transmitted television information. In this case, the counter tends to erroneously detect the pulse interval different from the VIR interval since it commences to count the time upon receipt of the noise pulse, thereby causing the VIR killer circuit to produce an erroneous VIR operation signal.

Therefore, a still further object of the present invention is to provide a VIR killer signal generating circuit capable of generating the VIR operation signal correctly even if such noise pulse occurs in the television receiver.

The present invention will now be fully described in connection with preferred embodiments thereof with reference to the accompanying drawings, in which.

Figure 4:
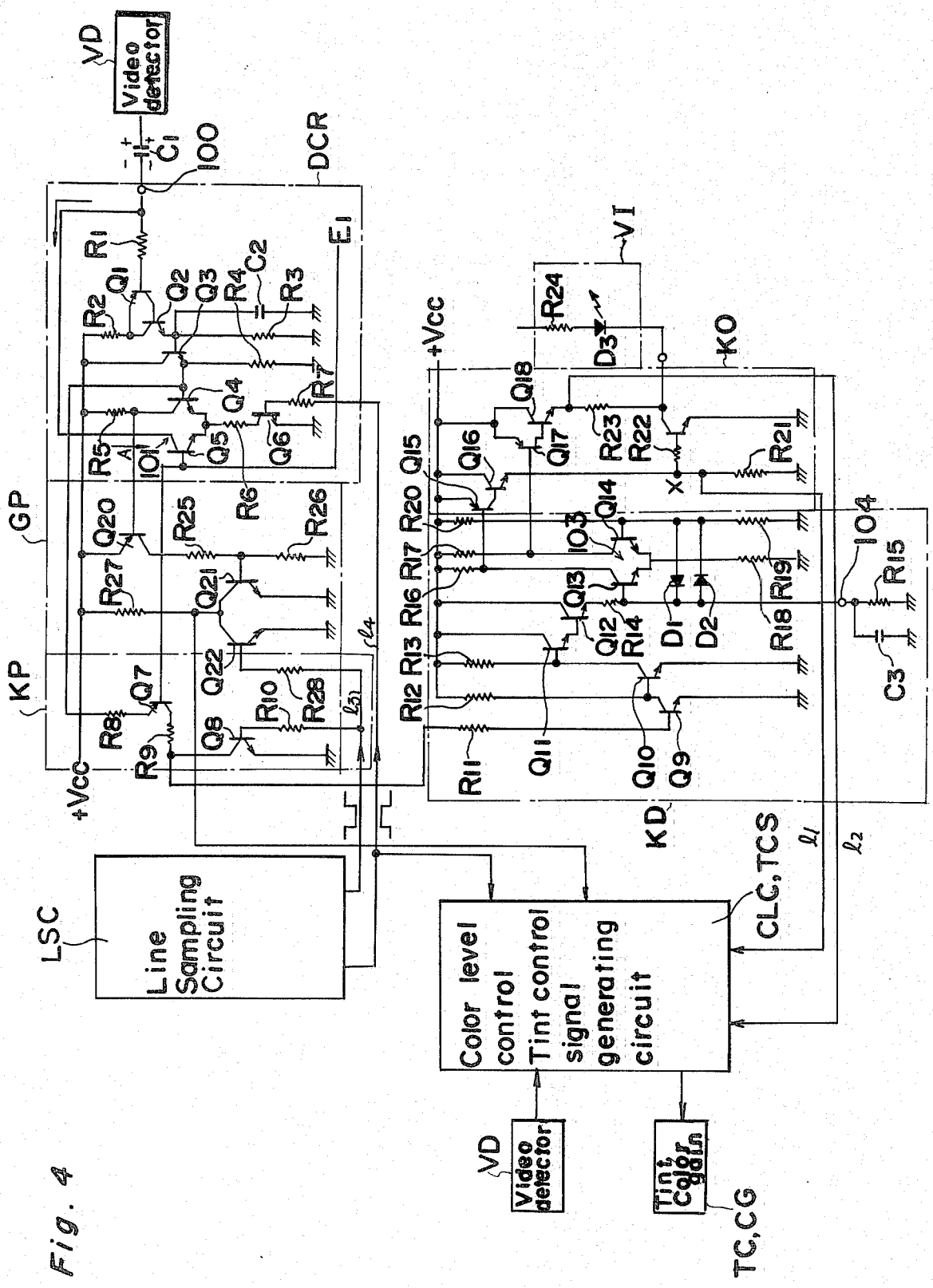
FIG. 4 is a circuit diagram showing the details of the VIR information processing circuit shown in FIG. 3.
Figure 6:
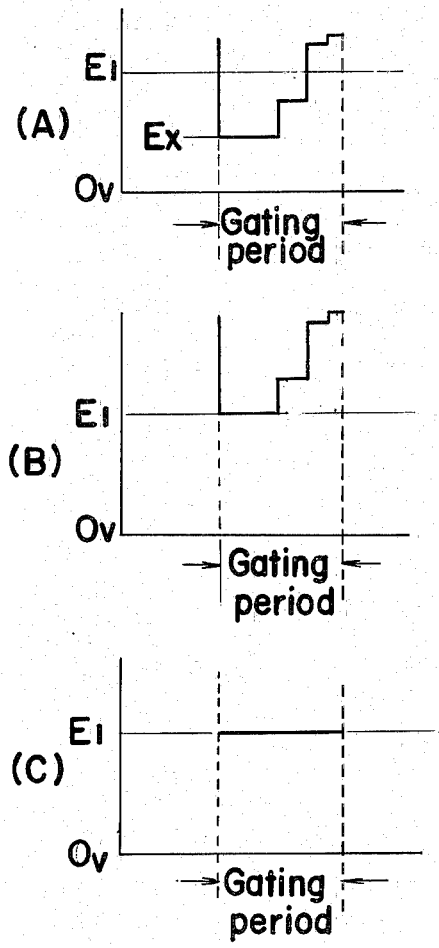
Figure 7:
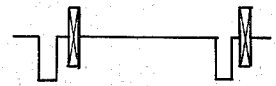
Figure 8:
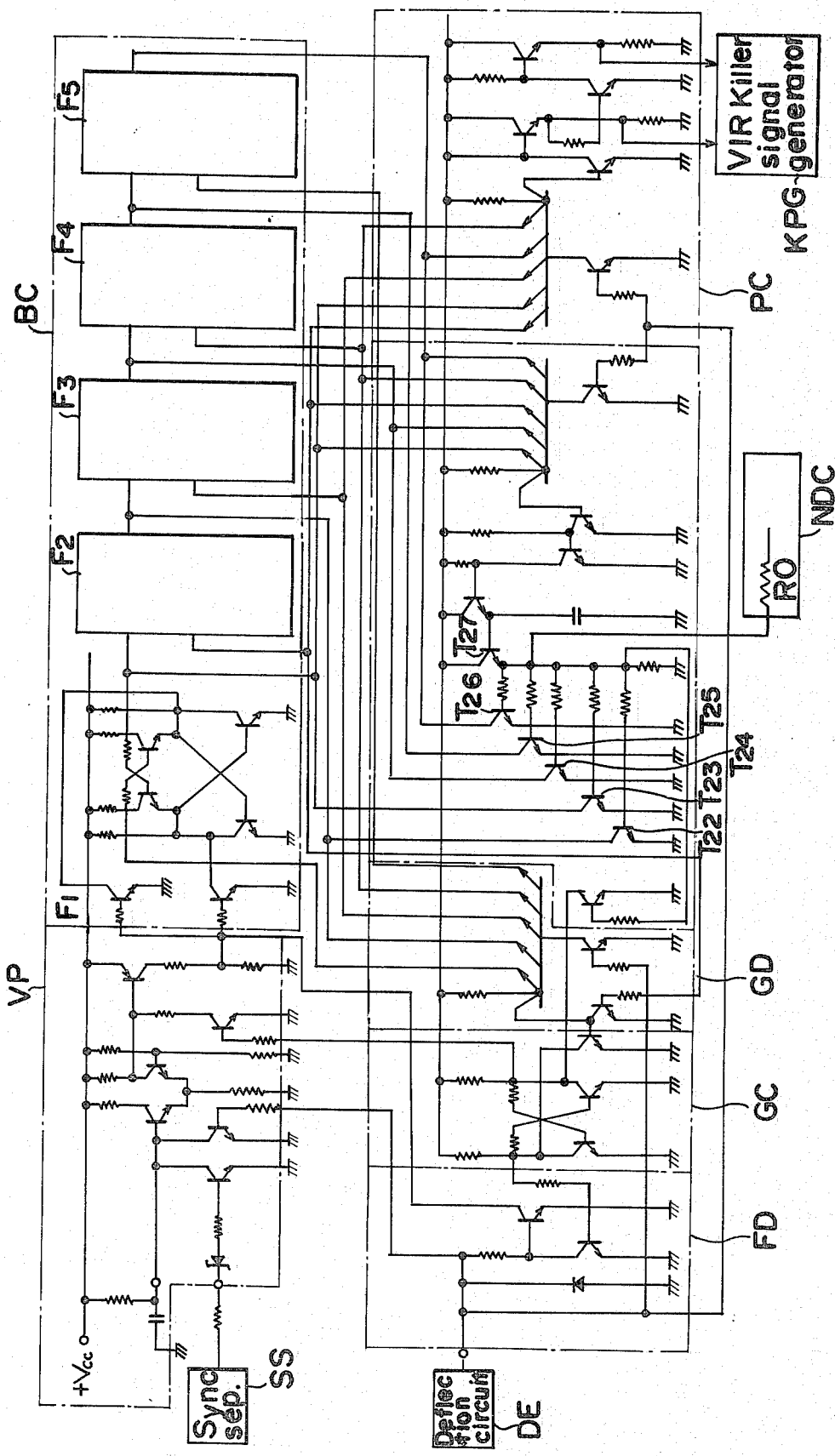
Figure 10:
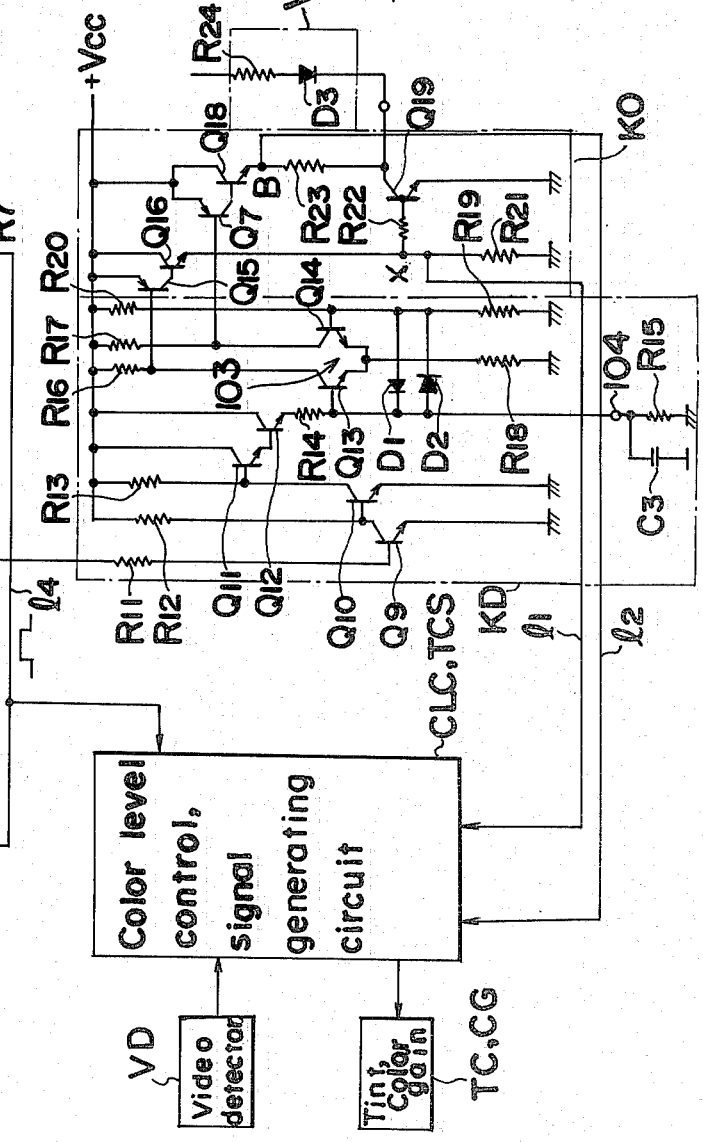
Figure 11:
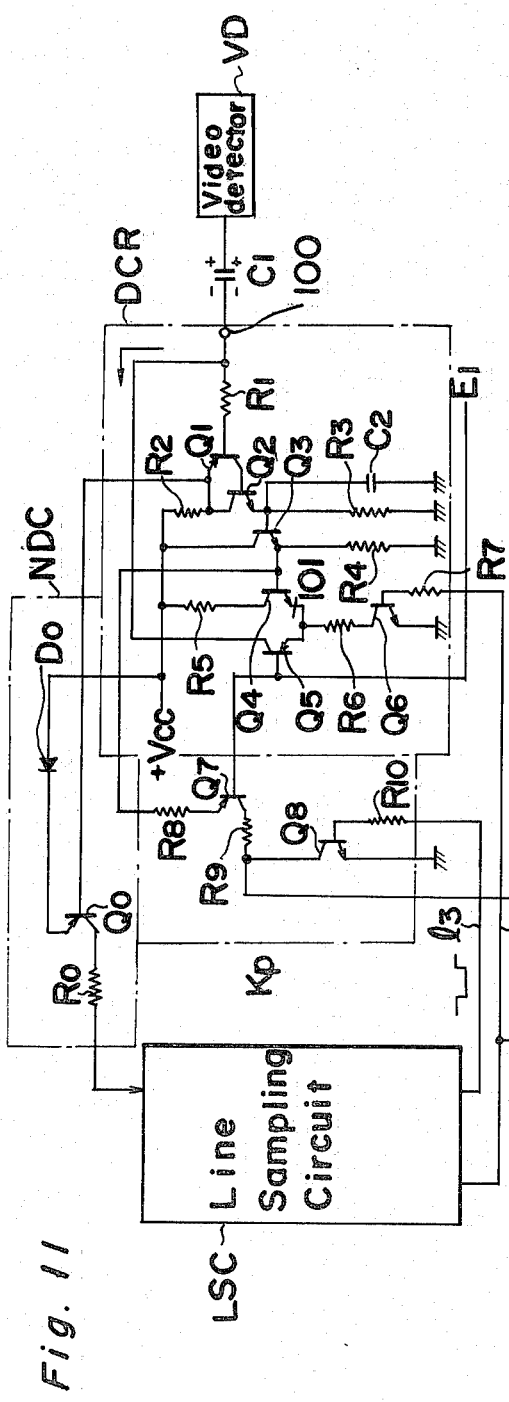

FIG. 5(A) through FIG. 5(I) show waveforms of signals appearing on essential portions of the circuit shown in FIG. 4;

FIG. 6(A) through FIG. 6(C) are schematic diagrams of waveforms showing different operations of a D.C. restorer employed in the circuit of FIG. 4;

FIG. 7 shows a waveform of a sync pulse which does not contain VIR information;

FIG. 8 is a detailed circuit diagram of a line sampling circuit employed in the embodiment of the present invention;

FIG. 9(A) through FIG. 9(K) show various waveforms of signals appearing on essential portions of the line sampling circuit shown in FIG. 8;

FIG. 10 is a block diagram of an essential portion of the circuit according to another embodiment of the present invention; and FIG. 11 is a detailed circuit diagram of the circuit shown in FIG. 10.

Before the description of the present invention proceeds, it is to be noted that like parts are designated by like reference numerals throughout the accompanying drawings.

Figure 3I:
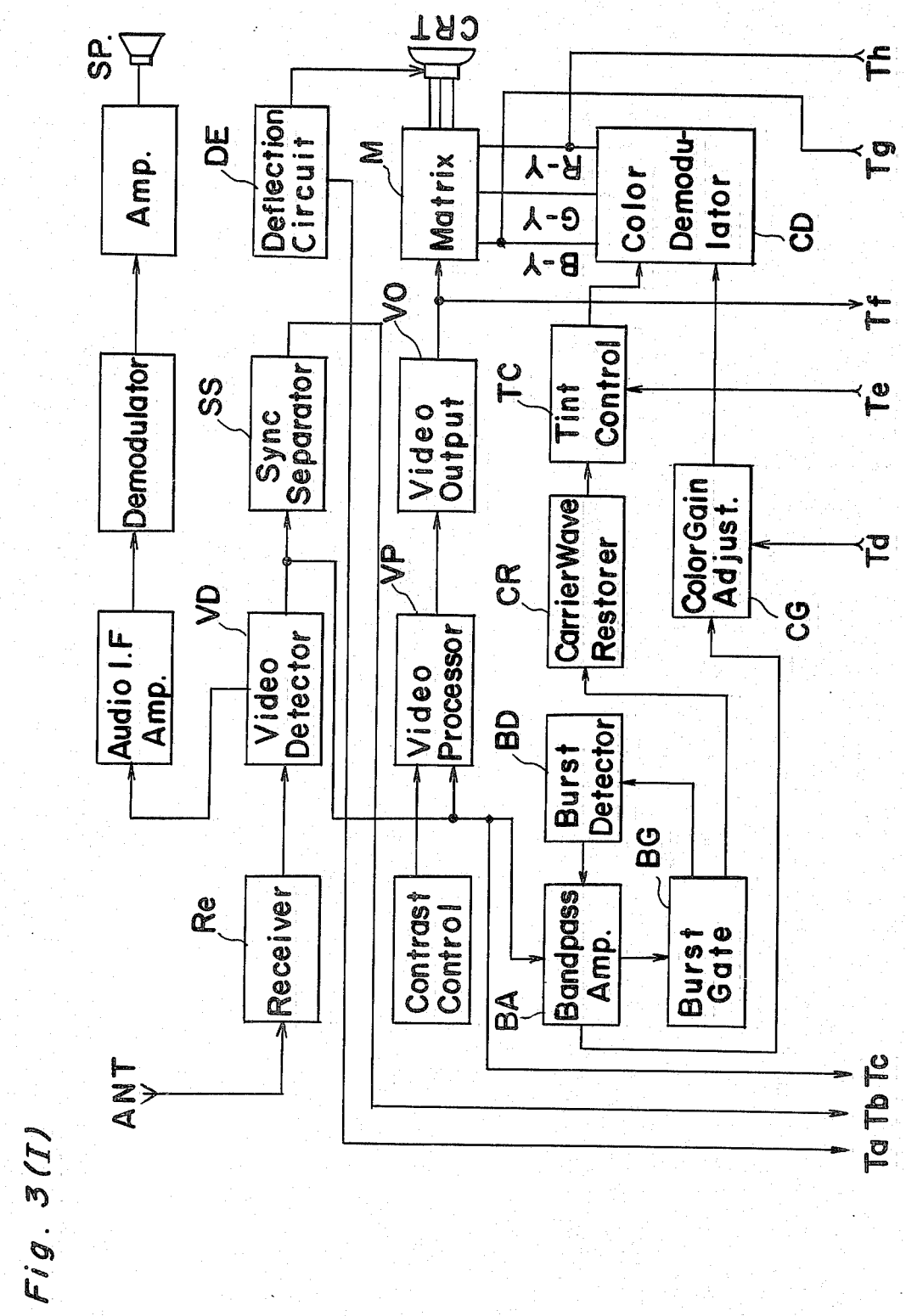
FIG. 3 is a block diagram of a color television receiver having a VIR information processing circuit of the present invention incorporated, FIG. 3 being divided into two parts which are respectively designated by FIG. 3(I) and FIG. 3(II)

Referring first to FIG. 3, there is shown a circuit block diagram of a color television receiver set. As is well understood by those skilled in the art, a composite video and audio information intercepted by an antenna ANT is first fed to a receiver circuit Re which comprises the customary tunable front end, oscillator modulator, and one or more stages of intermediate frequency amplification. This receiver circuit Re applies an amplified composite video and audio information to a video detector VD from which both an audio signal and a composite video signal are issued, the audio signal being reproduced through a loud speaker SP after having been fed through an audio intermediate frequency amplifier, then an audio signal demodulator and finally an amplifier in a manner well known to those skilled in the art. The composite video signal issued from the receiver circuit Re is then applied to a sync separator SS on one hand and to both a video processor VP and a bandpass amplifier BA on the other hand. The composite video signal, which has been fed to the video processor VP is reproduced as a television picture through a cathode ray tube CRT after having been fed through a video output circuit VO and a color decoding matrix circuit M.

The bandpass amplifier BA, together with a burst detector BD and a burst gating circuit BG, forms a circuit for detecting a burst signal included in the composite video signal, which burst signal is then fed to a carrier wave restorer CR where the subcarrier wave is synchronized in phase with the burst signal as is well known to those skilled in the art. The phase-synchronized subcarrier wave emerging from the carrier wave restorer CR is fed through a tint control TC to a color demodulator CD from which B-Y, G-Y and R-Y color difference signals are generated to the matrix M on the strength of an output signal from a color gain adjusting circuit CG where a color information filtered from the composite video signal by the bandpass amplifier BA and subsequently fed thereto is adjusted in reference to a chrominance or chroma reference signal. The chroma reference signal is fed from an automatic color level control signal generating circuitry CLC which will be described later.

The sync separator SS separates a composite synchronizing signal from the composite video signal, which is in turn applied to a line sampling circuit LSC as will be described later.

Figure 1:
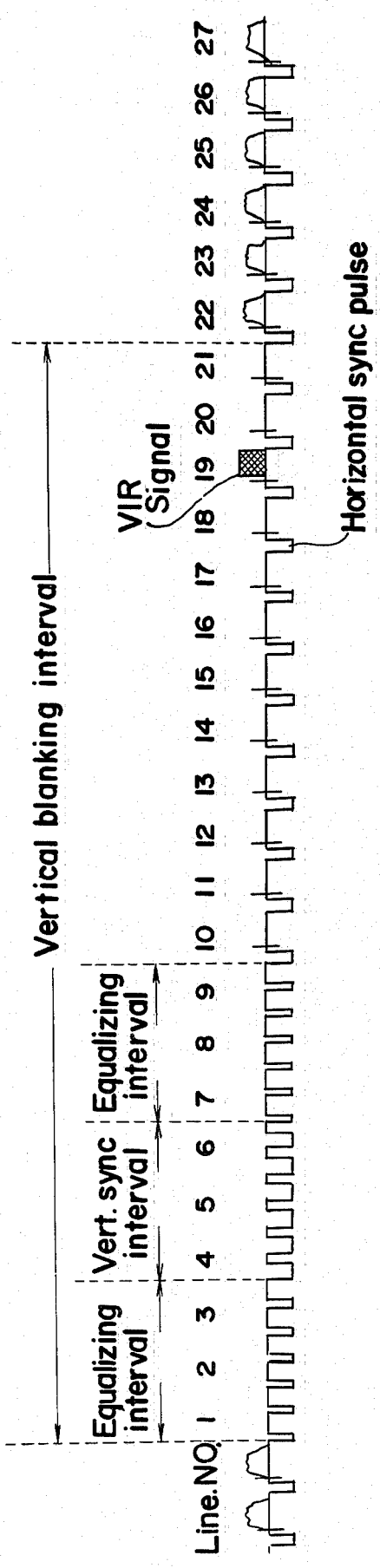
FIG. 1 is a schematic diagram showing a composite video signal contained in the vertical blanking interval.
Figure 2:
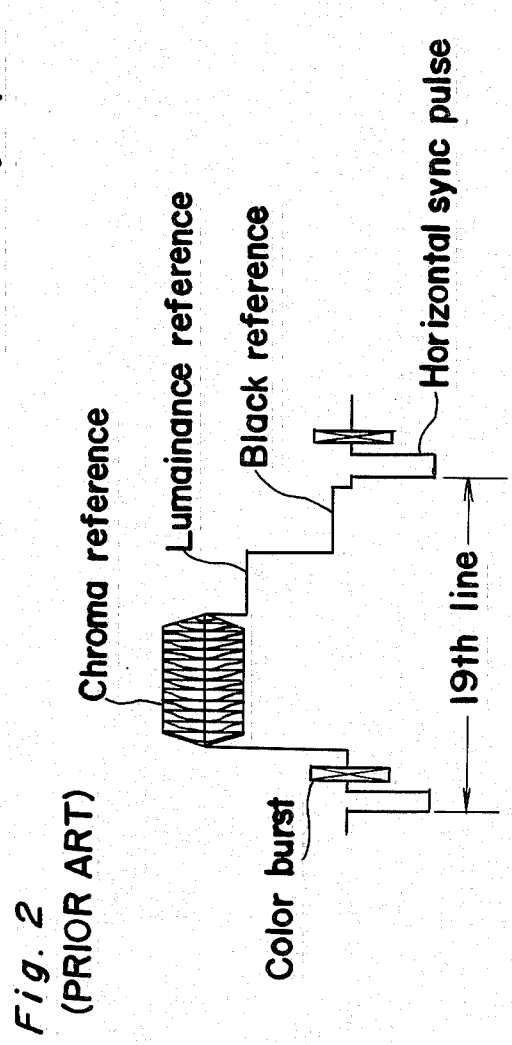
FIG. 2 is a schematic diagram showing a waveform of a VIR signal.

For effecting a tint adjustment by the utilization of a vertical interval reference (VIR) signal included in the transmitted television information as shown by a waveform in FIG. 1, the details of the VIR signal being shown by the waveform in FIG. 2, the tint control TC is adapted to be controlled by a tint control signal generated from a tint control signal generating circuitry TCS.

It is to be noted that most circuit components of the color television receiver set, particularly, those shown in FIG. 3, Part (I), are well known to those skilled in the art and, therefore, the details thereof are herein omitted for the sake of brevity.

Referring particularly to FIG. 3, Part (II), the details of each of the line sampling circuitry LSC, automatic color level control signal generating circuitry CLC and the tint control signal generating circuitry TCS, which are advantageously employed in combination with the VIR killer signal generting circuitry to which the present invention pertains, are disclosed in the copending patent applications, respectively, assigned to the same assignee of the present invention and, therefore, each of these circuitries LSC, CLC and TSC will now be described in terms of its function.

Referring now to FIG. 3, Part (II), there is shown a circuit block diagram of the line sampling circuit LSC which comprises a verticalsync pulse gate circuit VP, a gate circuit GC, a flyback pulse gate circuit FP, a vertical sync pulse gate decoder GD, 5-bit binary counter BC, a reset decoder RD and a VIR pulse decoder PD. The vertical pulse gate circuit VP receives composite sync pulses (FIG. 9, waveform (B)) produced from the sync separator SS and detects only the verticalsync pulses which are fed to the 5-bit binary counter BC. The vertical pulse gate decoder GC connected to the 5-bit binary counter BC counts an even number of vertical sync pulses, such as two verticalsync pulses. Upon receipt of the appropriate signal from the vertical pulse gate decoder GD, the gate circuit GC controls the vertical pulse gate VP to cease feeding further vertical sync pulses towards the 5-bit counter BC and also actuates the flyback pulse gate FP. Upon actuation of the flyback pulse gate FP, a horizontal flyback pulse (FIG. 9, waveform (E)) produced from a flyback circuit of a deflection circuit DE is applied to the binary counter BC. Accordingly, the binary counter BC receives two vertical sync pulses (FIG. 9, waveform (D)) from the vertical pulse gate VP and, thereafter, receives a train of flyback pulses from the flyback pulse gate FP. As a consequence, the binary counter BC receives a train of pulses, the waveform of which is shown by (G) in FIG. 9. The VIR pulse decoder PD connected to the binary counter BC produces a pulsating signal S (FIG. 9, waveform (K)) after the binary counter BC has counted the seventeen pulses. The pulse duration of the pulsating signal produced from the VIR pulse decoder PD is equal to a period of time necessary for completing each horizontal scanning line, that is, 1H, so that the pulsating signal S covers the line 19 carrying the VIR signal.

Figure 9:
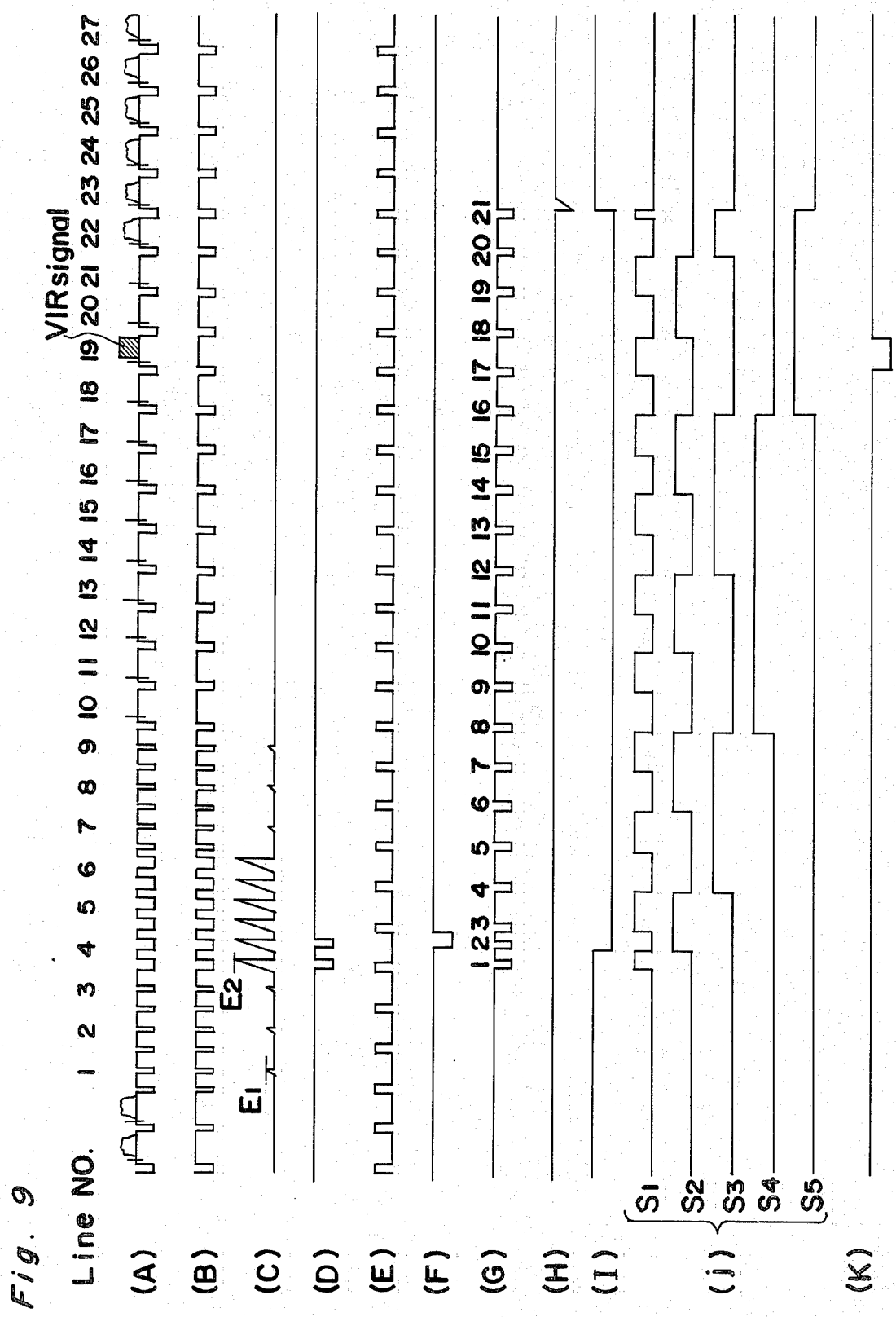

The reset decoder RD connected to the binary counter BC produces a reset signal (FIG. 9, waveform (B)) after the binary counter BC has counted twenty-one pulses. Such reset signal is applied to the binary counter BC and to the gate circuit GC for resetting the line sampling circuit LSC to return to the initial condition in which the vertical pulse gate VP is ready to count the vertical sync pulses in the succeeding field.

The VIR chroma gate pulse and VIR killer signal generating circuitry KPG is constituted by a VIR chroma gate pulse generator GP, a D.C. restorer DCR, a VIR killer pulse generator KP, a VIR killer detector KD and a killer output circuit KO. This VIR chroma gate pulse and VIR killer signal generating circuitry KPG is so designed as to generate a pulse, equal in duration of the chroma reference component of the VIR signal at an output terminal T1, and killer output signal at an output terminal T2 said killer output signal being generated so long as television receiver set is intercepting the transmitted television information containing the VIR signal.

More specifically, the video signal from the video detector VD is applied to the DC restorer DCR where DC components of the VIR signal included in the video signal so applied are sampled. These sampled DC components of the VIR signal are processed at the VIR chroma gate pulse generator GP with the VIR indicative pulse fed from the line sampling circuitry LSC to provide the pulse indicative of the chroma reference component of the VIR signal at the terminal T1 which is in turn applied to the tint control signal generating circuitry TCS and to the automatic color level control signal generating circuitry CLC.

On the other hand, the output from the DC restorer DCR is also applied to the VIR killer pulse generator KP which generates a VIR operation pulse and a VIR killer pulse one at a time to the VIR killer detector in response to whether or not the level of the sampled DC components of the VIR signal exceeds over a predetermined value due to the presence and absence of the VIR signal. The VIR killer detector KD upon receipt of the VIR operation pulse from the VIR killer pulse generator KP generates a VIR operation signal indicative of the presence of the VIR signal in the transmitted television information, with which the killer output circuit is energized to generate the trigger pulse to an output terminal T2 on one hand and to energize a VIR indicator VI, which may be constituted by a light emissive diode, to visually show that the transmitted television information being intercepted by the television receiver set includes the VIR signal. It is to be noted that, in the absence of the VIR signal in the transmitted television information, the killer detector KD generates the VIR killer signal to the killer output circuit KO.

The VIR killer signals are fed to the VIR killer switches contained in each of the color level control signal generating circuitry CLC and the tint control signal generating circuitry TSC so as to render the circuitries CLC and TSC inoperative.

The automatic color level control signal generating circuitry CLC comprises a zero chroma clamping circuit CCC for clamping a DC component of the B-Y color difference signal and a pedestal clamping circuit PC for clamping the pedestal level of the video signal. The level of the B-Y color difference signal and that of the pedestal portion of the video signal, respectively clamped by the clamping circuits CCC and PC, are applied to a comparator MC where they are compared with each other in a period for the chroma reference component of the VIR signal. If the difference exists therebetween, an output signal indicative of such difference is stored in a store circuit STC which is in turn fed through a VIR killer switch KSW to the color gain adjusting circuit CG to control the video signal in accordance with the chroma reference component of the VIR signal.

The tint control signal generating circuitry TCS comprises a zero chroma clamping circuit CC, a zero level comparator LC, a store circuit SC and a VIR killer switch SW and is so designed as to detect a difference between the outputs generated in a period for the vertical sync pulse and in a period for the chroma reference component of the VIR signal from the R-Y demodulator CD and also to generate the tint control signal necessary to correct the phase difference between the carrier wave and the chrominance information in accordance with the difference so detected.

As is well known to those skilled in the art, the demodulation axes in color demodulator CD are at different angles with respect to one another and also with respect to that of the color burst component. In particular, the R-Y demodulation axis within quadrature with the burst component while the B-Y demodulation axis is at 180° or minus phase, that is, shifted 90° in phase from the R-Y demodulation axis. The chroma reference component of the VIR signal is the same in phase with the B-Y color difference signal and in frequency with the burst component. Accordingly, the demodulation of the VIR signal will produce an output signal at the B-Y and G-Y demodulator outputs, but no signal at the R-Y demodulator output if and only if the burst component is at the proper zero phase reference. If the R-Y and B-Y demodulator axes are shifted 90° with respect to each other and chroma reference component of the VIR signal coincides with the B-Y demodulation axis, then an appropriate signal will be generated at the R-Y demodulator output, since the required quadrature relation no longer exist, which appropriate signal, that is, an R-Y demodulator output signal, is utilized to produce the tint control signal.

The essential portion of circuit arrangement shown in FIG. 3, Part (II) is preferably made in the form of an integrated circuit.

Referring to FIG. 4, the base of a transistor Q1 is connected through a resistor R1 to a terminal pin 100 provided in an integrated circuit device, to which a capacitor C1 is connected. The capacitor C1 receives composite video signals shown in FIG. 1 derived from the video detector VD.

Transistors Q1 and Q2 are connected in the form of a Darlington circuit.

A capacitor C2 and a resistor R3 are connected between the emitter of the transistror Q2 and the ground so that the chroma frequency component of the VIR information can be filtered out.

The emitter of the transistor Q2 is connected to the base of a transistor Q3 of which emitter is followed by a first transistor Q4 providing a differential pair 101 with a second transistor Q5 which receives a constant reference voltage E1 at the base thereof. A constant current transistor Q6 and a resistor R6 are provided between the emitter of each of the transistors Q4 and Q5 and the ground.

Figure 5:
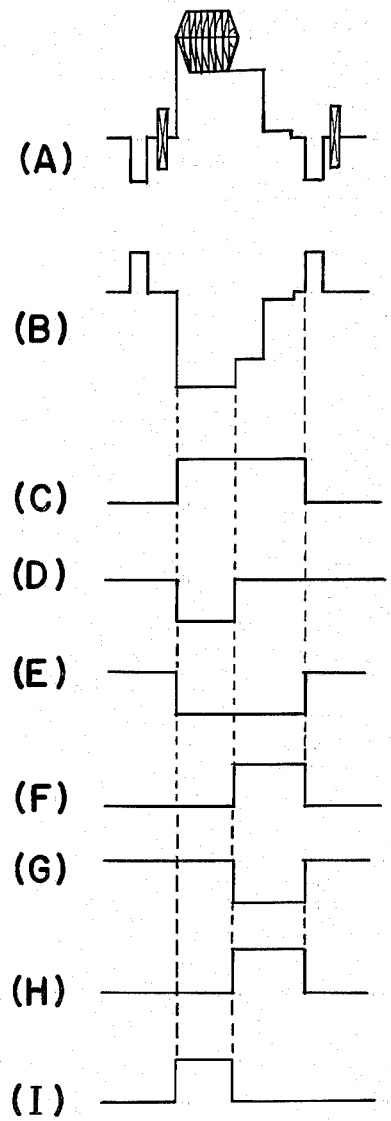

A positive gate pulse as shown in FIG. 5(C) which is indicative of the 19th line of the composite sync signal is applied to the base of the transistor Q6 through a resistor R7 from the line sampling circuitry LSC so that the differential pair 101 is brought into operative state in response to conduction of the transistor Q6.

The base of the first transistor Q4 is connected to the emitter of a PNP type transistor Q7 through a resistor R8 and the collector thereof is connected to an emitter-grounded transistor Q8 through a resistor R9. A negative gate pulse, shown in FIG. 5(E), is fed to the base of the transistor Q8 through a resistor R10. By this arrangement, the transistor Q8 composes said negative gate pulse and a positive pulse (FIG. 5(C)) appearing on the base of the transistor Q4 in response to the VIR signal, whereby a VIR operation pulse indicative of the presence of the VIR signal can be obtained at the collector of the transistor Q8.

The collector output of the transistor Q8 is connected to the base of a transistor Q9 through a resistor R11. The transistor Q9 is followed by an emitter-grounded transistor Q10 of which collector is connected to the base of a transistor Q11 and, in turn, the emitter thereof is connected to the base of a transistor Q12. Each transistor Q9 through Q12 are switched on and off in response to respective signals fed from the front stages preceding to such transistor.

A capacitor C3 and a resistor R15, which are provided outside the integrated circuit, are connected with the emitter of the transistor Q12 through a resistor R14. This capacitor C3 with the resistor R15 has a time constant longer than one field period and, therefore, the capacitance of the capacitor C3 is relatively large with respect to the current fed from the transistor Q12 which is arranged in the integrated circuit. A diode D1 is provided to compensate for the shortage of the current issued from the transistor Q12 as will be described later.

A differential pair 103, composed of transistors Q13 and Q14, is provided following to the transistor Q12 in order to detect the potential of the capacitor C3.

The diode D1 for charging the capacitor C3 preliminarily is provided between the bases of the respective transistors Q13 and Q14, i.e., between the capacitor C3 and a voltage divider consisting of resistors R20 and R19. By this ciruit arrangement, prior to the conduction of the transistor Q12, the capacitor C3 can be charged to a potential Vo which is slightly lower than the turn-on voltage which is required to switch the transistor Q13 on. The potential Vo is settled by the voltage appearing across the resistor R19. Therefore, when the transistor Q12 conducts, the potential of the capacitor C3 rapidly rises to the turn-on voltage thereby rendering the transistor Q13 to be switched on.

A diode D2 reversedly connected with the diode D1 operates to suppress overcharge of the capacitor C3.

Transistors Q15 and Q16 are provided to receive the collector output of the transistor Q13 during the conduction of the latter. The transistor Q16 is rendered conductive to produce a VIR operation signal, which enables the tint and color control signal generating circuitries TCS and CLC, on a line 11 when the VIR signal containing video information is being intercepted by the televison receiver set.

Transistors Q17 and Q18 of Darlington connection are provided to receive the collector output of the transistor Q14. The transistor Q18 is rendered conductive to produce on a line 12 a VIR killer signal which prohibits the operation of the tint and color control signal generating circuitries TCS and CLC when the ordinary video information is being intercepted by the television receiver set.

A photo emissive diode D3 is provided in the collector of a transistor Q19 which has its base connected to the line 11 through a resistor R22. The photo emissive diode D3 is turned on when the television receiver intercepts the VIR signal containing video information.

In the circuit arrangement described above, when the color television receiver receives a VIR signal containing video information, the line pulse sampling circuitry LSC detects the 19th line of the composite sync pulse train and generates positive and negative pulses on the lines l4 and l3, respectively. The transistor Q6 is turned on upon receipt of the positive pulse at its base thereby causing the transistor Q5 to conduct. Thus, a current as shown by the arrow A flows through the transistor Q5 and is charged on the capacitor C1 in a polarity as shown in FIG. 4. It is to be noted that the current A flowing through the capacitor C1 can be delivered from the video detector VD.

On the other hand, a composite video signal as shown in FIG. 1 is applied to the base of the transistor Q1 through the capacitor C1 from the video detector VD, the video information being reversed and appearing on the emitter of the transistor Q3. When the VIR signal contained in the 19th line is applied to the transistors Q1 and Q2, the VIR signal is reversed and the chroma frequency component of the VIR signal is filtered out by means of the capacitor C2, whereby restored direct current component of the VIR signal as shown in FIG. 5B appears on the emitter of the transistor Q2.

The DC component of the VIR signal as shown in FIG. 5B and FIG. 6A appears on the base of the transistor Q4 through the transistor Q3. It is to be noted that, as the charging of the capacitor C1 proceeds, the base potential of the transistor Q1 becomes lower and the emitter current of each of the transistors Q2 and Q3 increases. This in turn result in increase of the voltage appearing on the resistor R4, which is the base voltage of the transistor Q4, to a constant value E1 so that the transistors Q4 and Q5 can be held in equilibrium with each other. Therefore, the DC chroma level of the VIR signal appearing on the base of the transistor Q4 is clamped at the constant potential E1, which causes the DC restored VIR signal to elevate to such a level that the chroma level coincides with the potential E1 as shown in FIG. 6B on the base of the transistor Q4.

The base voltage of the transistor Q4 is fed to the emitter of the transitor Q7 which receives the reference potential E1 at the base thereof. Thus, the transistor Q7 becomes non-conductive during the chroma reference interval on one hand and becomes conductive during the luminance and black level intervals of the VIR signal during which the emitter voltage of the transistor Q7 becomes higher than the reference voltage E1. Accordingly, at the collector of the transistor Q7, a negative pulse appears in synchronism with the chroma reference interval of the VIR signal as shown in FIG. 5D.

This negative pulse is fed to the collector of the transistor Q8. This transistor Q8 is normally held in a conductive state by the positive signal fed from the line pulse sampling circuitry LSC and is rendered non-conductive upon receipt of the negative pulse during the 19th line interval. Thus, a positive pulse as shown in FIG. 5F which is a composition of waves of FIG. 5C and FIG. 5D appears on the collector of the transistor Q8 in synchronism with the luminance and black level intervals of the VIR signal.

The positive pulse is fed to the base of the transistor Q9 through the resistor R11, thereby to cause the transistor Q9 to be conductive and the transistor Q10 to be non-conductive. Consequently, the transistors Q11 and Q12 are sequentially switched on.

Upon conduction of the transistor Q12, the latter delivers the current for charing the capacitor C3 which has preliminarily been charged up to the potential Vo by the current flowing through the diode D1. When the potential of capacitor C3 exceeds the threshold value of the transistor Q13, the transistor Q13 is switched on to cause the transistors Q15 and Q16 to be conductive so that a high level signal can appear on the emitter of the transistor Q16 or one end X of the resistor R21. This high level signal is applied to the tint and color control signal generating circuits CLC and TCS as VIR operation signal which enables the circuitries CLC and TCS to operate.

This high level signal is fed to the base of the transistor Q19 to switch the latter on. Upon conduction of the transistor Q19, the diode D3 is energized to emit light to show that the television receiver set is intercepting the VIR signal containing the television information.

On the other hand, the transistor Q14 is turned off in response to the conduction of the transistor Q13. This causes the transistors Q17 and Q18 to be turned off and, therefore, a low level signal is fed to the circuitries CLC and TCS through the line l2.

When the 19th line interval lapses, the transistor Q8 is turned on and the transistors Q9 and Q12 are turned off. Switching off of the transistor Q12 results in interruption of charging of the capacitor C3 and allows the capacitor C3 to be discharged through the resistor R15. It is to be noted, however, that the time constant of the resistor R15 and the capacitor C3 is longer than one field period so that the potential of the capacitor C3 can be held higher than the threshold value of the transistor Q13. Therefore, the VIR operation signal continues over one field period, i.e., so long as the VIR signal containing video information is intercepted by the television receiver set.

As understood from the foregoing, the pulse obtained at the collector of the transistor Q8 represents the interval of the luminance and black level reference interval. However, it is required to use the pulse synchronized with the chrominance reference component of the VIR signal for the VIR color control system.

The circuit arrangement GP may advantageously provide the chrominance interval pulse. During the reception of the VIR signal containing video information, the DC component of the VIR signal as shown in FIG. 6B is applied to the base of the transistor Q4. Accordingly, the transistor Q4 generates a negative pulse in synchronizm with the luminance and black level reference components of the VIR signal at the collector thereof.

The negative pulse is fed to the base of the transistor Q20 to switch the latter on so that a positive pulse as shown in FIG. 5H can be generated across the resistor R25 thereby to render the transistor Q21 to be conductive in synchronism with the luminance and black level reference components of the VIR signal.

On the other hand, a negative pulse shown in FIG. 5E indivative of the 19th line is fed to the base of the transistor Q22. Thus, the transistor Q22 is switched off and, therefore, a positive pulse shown in FIG. 5I appears at the collector of the transistor Q22. This positive pulse corresponds with the chrominance level interval of the VIR signal.

Provision of the circuit of the transistors Q8 and Q22 to compose the pulses fed from the transistors Q3 and Q4 and the pulse fed from the circuitry LSC prevents the generation of unnecessary pulses even though the transistor Q3 generates output pulses in response to the video information of the VIR signal applied to the transistor Q1 every line occurring after the vertical retrace interval.

When the ordinary video information, that is, the video information which does not contain the VIR signal, is received by the television receiver set, the transistors Q6 and Q8 are switched on and off, respectively, during the 19th line interval by the pulses fed from the line pulse sampling circuit LSC. However, since the video signal on the 19th line is pedestal as shown in FIG. 7, the DC restored signal reproduced by the circuit DCR attains a level equal to the potential E1 as shown in FIG. 6C. Thus, the transistor Q7 is held in non-conductive, resulting in that the transistors Q9, Q10, Q11 and Q12 are sequentially switched off, on off and off, respectively. Consequently, the transistor Q13 becomes switched off and the transistor Q14 becomes switched on. Then, the transistors Q15, Q16 and Q17 are turned off, respectively, to generate a low level signal on the line l1 and the diode D3 is deenergized. On the other hand, the transistors Q17 and Q18 are turned on to generate a high level signal on the line l2.

With these low and high level signals appearing on the respective lines l1 and l2, the tint and color control signal generating circuitries TCS and CLC are rendered inoperative.

The current flowing through the diode D1 and then through the resistor R17 charges the capacitor C3 to a predetermined potential which is lower than, but near the threshold of the transistor Q13 while the transistor Q12 is non-conductive. This precharge of the capacitor C3 is advantageous in that the capacitor C3 can readily be charged to a potential higher than the threshold of the transistor Q13 by the current flowing through the transistor Q12 when the latter is switched on as the television receiver set is switched over to intercept the VIR signal containing video information.

As previously described, the transistor Q12 supplies a relatively small amount of current for a relatively short period of time, i.e., during the occurrence of the VIR signal, since it is incorporated into the integrated circuit. Despite of this fact, since the diode D1 is employed to allow the capacitor C3 to be charged preliminarily to a voltage slightly lower than the threshold value of the transistor Q13 during the non-conduction of the transistor Q12 and, then, to be charged to a voltage higher than the threshold value of the transistor Q13 during the conduction of the transistor Q12, the capacitor C3 can, even though it has a relatively high capacitance, readily be charged to the required voltage necessary to trigger the transistor Q13 on.

When the voltage stored on the capacitor C3 reaches the predetermined value Vo, the diode D1 interrupts the supply of current to the capacitor C3 and the voltage will no longer be charged on the capacitor C3 since the anode potential of the diode D1 is settled at a value lower than the predetermined voltage Vo stored on the capacitor C3 by means of the resistors R19 and R20. Therefore, the transistor Q13 is held in a non-conductive state so far as the transistor Q12 is in a non-conductive state.

FIG. 10 and FIG. 11 show another embodiment of the present invention. In this embodiment, as shown in FIG. 10, a noise detection circuitry NDC is provided between the DC restorer DCR and the line pulse sampling circuitry LSC to prevent the VIR killer signal generator from operating erroneously in response to any noise pulse similar in property to the vertical sync pulse, which may occur in a color television receiver when a channel selector is changed over from one channel to another channel.

Referring to FIG. 11, a transistor Qo has a base thereof connected to the emitter of the transistor Q1 and a collector thereof connected to the reset input terminal of the line pulse sampling circuit LSC through a resistor Ro. A diode Do has its anode connected to the voltage source +Vcc and the cathode connected to the collector of the transistor Qo.

When an output level of the video detector reduces to a very low value incident to the television channel selecting operation or similar operation, the conductivity of each of the transistors Q1 and Q2 increases, resulting in increase of voltage drop across the resistor R2. In the case where this voltage drop exceeds 2Vf (wherein Vf is a set-up voltage of the diode Do), the transistor Qo is turned on. In other words, since the turn-on voltage between the emitter and the base of the transistor Qo is Vf, the voltage appearing across the resistor R2, which is equal to the voltage between the anode of the diode Do and the base of the transistor Qo, exceeds 2Vf, the diode Do and the transistor Qo are turned on, respectively. The collector current of the transistor Qo is fed to the line sampling circuit LSC to reset the latter.

In one embodiment, this reset signal is applied to the emitter of the transistor T27 which is arranged in the reset detector RD of the line sampling circuit LSC as shown in FIG. 8. When the reset signal is fed to the transistor T27, the base voltage of each of the transistors T22 to T26 becomes high sufficient to switch these transistors T22 to T26 on so that the collector voltage of any of these transistors T22 to T26 can be low level sufficient to reset the flip-flops F1 to F5 of the 5-bit counter BC.

Accordingly, the line pulse sampling circuit does not operate erroneously in response to the noise pulse similar in character to the sync pulse of the transmitted television information.

It is to be noted that, since the noise detector circuit described above is not operated so far as the input signal which tends to cause the voltage across the resistor R2 to be 2Vf or more is not fed to the input terminal 100, the line pulse sampling circuit and the VIR killer signal generator circuit can be operable in a usual manner.

Although the present invention has fully been described in connection with the preferred embodiments thereof with reference to the accompanying drawings, it is to be noted that various changes and modifications are apparent to those skilled in the art without departing from the true scope of the present invention. By way of example, although in the foregoing description of the present invention reference has been made to the VIR signal included in the transmitted television information, it is to be noted that the concept of the present invention can equally be applicable to a similar circuit dealing with a still picture information and/or a multiplexed voice information included in the transmitted television information.

Accordingly, such changes and modifications are to be understood as included within the true scope of the present invention unless they depart therefrom.

What is claimed is:

1. A killer signal generator for use in a color television receiver having an information processing circuit for processing specific information contained in a line occurring after equalizing pulse interval and vertical sync pulse interval included in the vertical blanking interval, said killer signal generator comprising:
   line pulse sampling means for generating pulses synchronized with the line in which said specific information is contained;
   D.C. restoring means for restoring D.C. component of a series of video information, which includes a differential pair composed of first and second transistors, said first transistor having a first electrode receiving the video information including said specific information, said second transistor having a first electrode connected to a source of constant reference potential, a second electrode connected to the second electrode of the first transistor and a third electrode connected to one of the opposed ends of a capacitor, the other of the opposed ends of the capacitor being adapted to receive said video information, and a constant current transistor connected to the second electrodes of the first and second transistors, said D.C. restoring means generating D.C. restored output on the first electrode of the first transistor corresponding to each information signal contained in the composite video signal and having a level higher than the pedestal level thereof;
   means for composing said D.C. restored output pulse and a pulse indicative of the duration of the line in which the specific information is contained, and for generating a pulse indicative of the specific information;
   a storing means for storing said pulse indicative of the specific information for at least one field period; and
   a killer signal generating means for generating an operation signal for enabling said information processing circuit in response to the output of the storage means when the color television receiver receives video information with said specific information and also a killer signal for bringing said information processing circuit into an inoperative condition when the color television receiver receives an ordinary video information.

2. A killer signal generator as claimed in claim 1, wherein said composing means comprises a PNP type transistor having an emitter thereof connected to the first electrode of the first transistor and a base connected to the first electrode of the second transistor.

3. A killer signal generator as claimed in claim 2, wherein said composing means comprises a further transistor having a collector and an emitter thereof connected between the collector of the PNP type transistor and a reference potential, said further transistor generating an output at the connection point with the PNP type transistor.

4. A killer signal generator as claimed in claim 1, wherein said storage means comprises a capacitor receiving a current corresponding to the composed signal, a diode for delivering a current to the capacitor from a voltage divider during the absence of the composed signal.

5. A killer signal generator as claimed in claim 1, further comprising means for detecting a noise pulse which occurs during the vertical retrace interval and means for generating a pulse for resetting the contents of the line sampling pulse generating means in response to the output of the detecting means.

6. A VIR killer signal generator for use in a color television receiver having an information processing circuit for processing VIR information contained in a line occurring after equalizing pulse interval and vertical sync pulse interval, said VIR killer signal generator comprising:
   line pulse sampling means for generating pulses synchronized with the VIR line period;
   D.C. restoring means for restoring D.C. component of a series of video information, which includes a differential pair composed of first and second transistors, said first transistor having a first electrode receiving the video information including said VIR information, said second transistor having a first electrode connected to a source of constant reference potential, a second electrode connected to the second electrode of the first transistor and a third electrode connected to one of the opposed ends of a capacitor, the other of the opposed ends of the capacitor being adapted to receive said video information, and a constant current transistor connected to the second electrodes of the first and second transistors, said D.C. restoring means generating D.C. restored output on the first electrode of the first transistor corresponding to each information signal contained in the composite video signal and having a level higher than the pedestal level thereof;
   pulse generating means for generating an output pulse in response to D.C. restored output;
   means for composing said output pulse and a pulse indicative of the duration of the VIR line and for generating a pulse indicative of the VIR information;
   a storage means for storing said pulse indicative of the VIR information for at least one field period;
   a killer signal generating means for generating an operation signal for enabling said information processing circuit in response to the output of the storage means when the color television receiver receives video information with VIR information and also a killer signal for bringing said information processing circuit into an inoperative condition when the color television receiver receives an ordinary video information; and, means for generating a chroma reference interval pulse by composing a pulse having a pulse width generally equal to one horizontal synchronizing interval and an output of said first transistor, which is synchronized with the luminance and black level reference interval of the VIR information.

* * * * *